(12) United States Patent
Vallius et al.

(10) Patent No.: US 10,698,214 B2
(45) Date of Patent: Jun. 30, 2020

(54) OPTICAL DEVICE TO IMPROVE IMAGE UNIFORMITY

(71) Applicant: MICROSOFT TECHNOLOGY LICENSING, LLC, Redmond, WA (US)

(72) Inventors: Tuomas Vallius, Espoo (FI); Jani Tervo, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 568 days.

(21) Appl. No.: 15/407,957

(22) Filed: Jan. 17, 2017

(65) Prior Publication Data

US 2018/0203230 A1 Jul. 19, 2018

(51) Int. Cl.
*G02B 27/01* (2006.01)
*G02B 27/00* (2006.01)

(52) U.S. Cl.
CPC ..... *G02B 27/0172* (2013.01); *G02B 27/0081* (2013.01); *G02B 2027/0125* (2013.01)

(58) Field of Classification Search
CPC ........ G02B 27/0172; G02B 2027/0178; G02B 27/0176; G02B 27/0101;
(Continued)

(56) References Cited

U.S. PATENT DOCUMENTS 7,133,204 B2 11/2006 Urey
8,320,032 B2 11/2012 Levola
(Continued)

FOREIGN PATENT DOCUMENTS

WO 2016011367 A2 1/2016

OTHER PUBLICATIONS

Urey, Hakan, "Diffractive exit-pupil expander for display applications", In Journal of Applied Optics, vol. 40, Issue 32, Nov. 10, 2001, 3 pages.
Mukawa, et al., "8.4: Distinguished Paper: A Full Color Eyewear Display using Holographic Planar Waveguides", In Proceedings of SID Symposium Digest of Technical Papers, vol. 39, Issue 1, May 2008, pp. 89-92.
(Continued)

*Primary Examiner* — Thomas K Pham
*Assistant Examiner* — Sharrief I Broome
(74) *Attorney, Agent, or Firm* — Alleman Hall Creasman & Tuttle LLP

(57) ABSTRACT

An optical waveguide including an input-coupler, a first intermediate-component, a second intermediate-component and an output-coupler is described herein. The input-coupler couples, into the waveguide, light corresponding to an image associated with an input-pupil and directs the light toward the first intermediate-component. The first intermediate-component performs horizontal or vertical pupil expansion and redirects the light corresponding to the image toward the output-coupler. The second intermediate-component is a diffractive component located between the first-intermediate component and the output-coupler and performs pupil redistribution on a portion of the light corresponding to the image before the portion reaches the output-coupler. The output-coupler performs the other one of horizontal or vertical pupil expansion and couples, out of the waveguide, the light corresponding to the image. Related methods and systems are also described.

17 Claims, 7 Drawing Sheets

(58) Field of Classification Search
CPC .... G02B 2027/0118; G02B 2027/0138; G02B 27/017; G02B 2027/014; G02B 27/0093; G02B 5/30; G02B 2027/015; G02B 2027/0123; G02B 27/01; G02B 27/0149; G02B 2027/0154; G02B 2027/0127; G02B 2027/013; G02B 2027/0159; G02B 2027/011; G02B 2027/0161; G06F 3/013; G06F 3/017; G06F 1/163; G06F 3/012; G06F 3/011; G06F 3/005; G06F 3/03545; G06F 3/04883; G06F 5/10; G06F 1/203; G06F 1/206; G06F 3/016; G06F 3/0317; G06F 3/0362; G06F 3/0412; G06F 1/1632; G06F 3/014; G06F 3/041; G06F 3/045; G06F 3/16; B60K 35/00; B60K 2370/1529; B60K 2370/66; B60K 2370/67; B60K 37/02; B60K 2370/151; B60K 2370/1531; B60K 2370/154; B60K 2370/155; B60K 2370/174; B60K 2370/177; B60K 2370/178; B60K 2370/186; B60K 2370/1868; B60K 2370/191; B60K 2370/194; B60K 2370/20; B60K 2370/334; B60K 2370/52; B60K 2370/73

See application file for complete search history.

(56) References Cited

U.S. PATENT DOCUMENTS

| | | | |
|---|---|---|---|
| 8,508,848 B2 | 8/2013 | Saarikko | |
| 8,611,014 B2 | 12/2013 | Valera et al. | |
| 9,366,864 B1 | 6/2016 | Brown et al. | |
| 2010/0296163 A1* | 11/2010 | Saarikko | G02B 5/1814 359/567 |
| 2012/0002256 A1* | 1/2012 | Lacoste | G02B 27/0081 359/9 |
| 2012/0033306 A1* | 2/2012 | Valera | G02B 27/4205 359/630 |
| 2014/0240834 A1* | 8/2014 | Mason | G02B 27/0081 359/567 |

OTHER PUBLICATIONS

Chellapan, et al., "Laser-based displays: A review", In Journal of Applied Optics, vol. 49, No. 25, Sep. 1, 2010, pp. F79-F98.

Kress, et al., "Diffractive and Holographic Optics as Optical Combiners in Head Mounted Displays", In Proceedings of ACM International Joint Conference on Pervasive and Ubiquitous Computing Adjunct Publication, Sep. 8, 2013, pp. 1479-1482.

Äyräs, et al., "Exit pupil expander with a large field of view based on diffractive optics", In Journal of the Society for Information Display, vol. 17, Issue 8, Aug. 2009, 2 pages.

* cited by examiner (front view)**

(side view)**

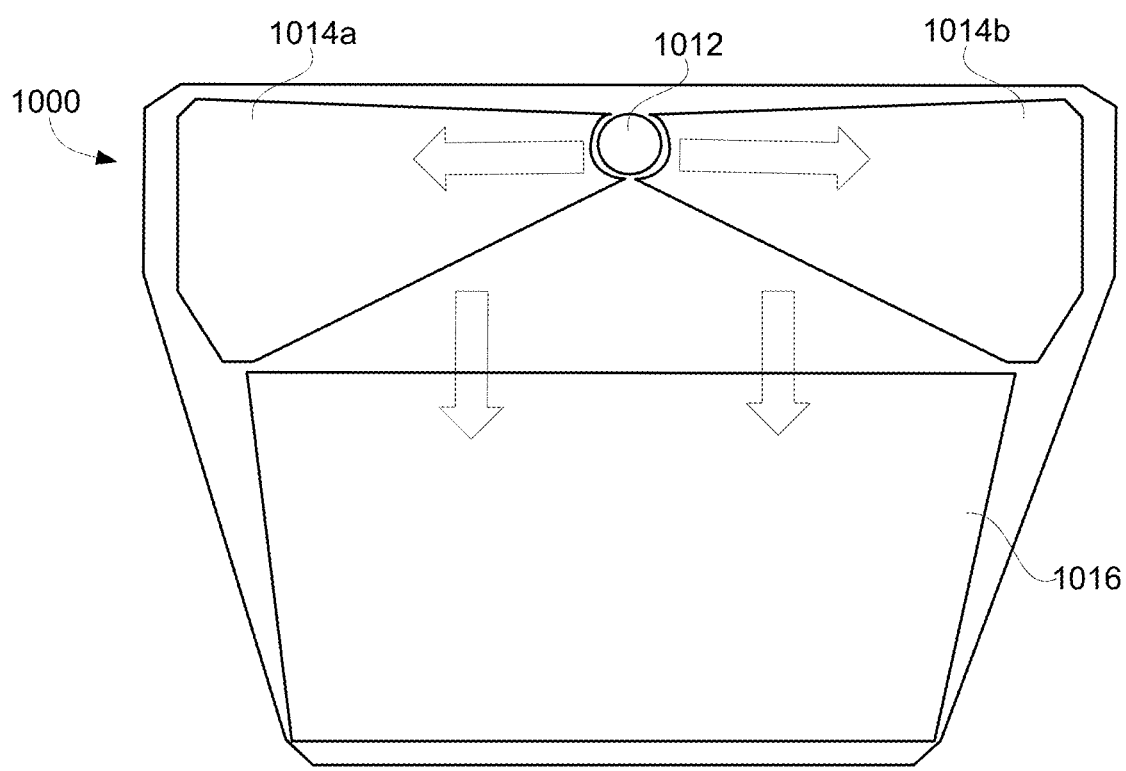
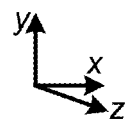
FIG. 10

OPTICAL DEVICE TO IMPROVE IMAGE UNIFORMITY

BACKGROUND

Various types of computing, entertainment, and/or mobile devices can be implemented with a transparent or semi-transparent display through which a user of a device can view the surrounding environment. Such devices, which can be referred to as see-through, mixed reality display systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides to display images of virtual objects to a user.

SUMMARY

Certain embodiments of the present technology relate to an apparatus for use in replicating an image associated with an input-pupil to an output-pupil. Embodiments of the present technology also relate to a near-eye or heads-up display system that include such an apparatus. Further embodiments of the present technology relate to methods for use with display systems.

In accordance with certain embodiments, an apparatus includes an optical waveguide having an input-coupler, a first intermediate-component, a second intermediate-component and an output-coupler. The input-coupler of the optical waveguide is configured to couple, into the optical waveguide, light corresponding to the image associated with an input-pupil and configured to direct the light corresponding to the image toward the first intermediate-component. The first intermediate-component is configured to perform one of horizontal or vertical pupil expansion on the light corresponding to the image that is directed toward the first intermediate-component by the input-coupler and configured to redirect the light corresponding to the image toward the output-coupler. The second intermediate-component is a diffractive component located between the first-intermediate component and the output-coupler and is configured to perform pupil redistribution on a portion of the light corresponding to the image before the portion of the light reaches the output-coupler. The output-coupler is configured to perform the other one of horizontal or vertical pupil expansion and is configured to couple, out of the optical waveguide, the light corresponding to the image that has traveled through the optical waveguide from the input-coupler to the output-coupler at least in part by way of total internal reflection (TIR).

In accordance with certain embodiments, the second intermediate-component diffracts and thereby interacts with the light corresponding to the image travelled by way of TIR from the first intermediate-component to the output-coupler. For example, the second intermediate-component can be configured to cause both zero-order diffraction and at least one of positive or negative first-order diffraction. The first intermediate-component can also be configured to cause both zero-order diffraction and at least one of positive or negative first-order diffraction.

In accordance with certain embodiments, the second intermediate-component is configured to cause the light that is output from the optical waveguide by the output-coupler to have a more uniform intensity distribution compared to if the second intermediate-component were absent and the light corresponding to the image travelled by way of TIR from the first intermediate-component to the output-coupler without interacting with the second intermediate-component. More specifically, the second intermediate-component can be configured to increase overlap of pupils that are replicated within the waveguide compared to if the second intermediate-component were absent.

In certain embodiments, with respect to a front view of the waveguide, the first intermediate-component is located to a side of the input-coupler, the second intermediate-component is located below the first intermediate-component and the output-coupler is located below the second intermediate-component. Other relative locations of the various optical components are also possible and within embodiments of the present technology.

A method according to an embodiment of the present technology includes using a display engine to produce light corresponding to an image. Such a method also includes using an input-coupler of the optical waveguide to couple the light corresponding to the image into the optical waveguide and to direct the light corresponding to the image toward a first intermediate-component of the optical waveguide. A first intermediate-component of the optical waveguide is used to redirect the light corresponding to the image toward an output-coupler of the optical waveguide. A second intermediate-component of the optical waveguide, which is a diffractive component located between the first-intermediate component and the output-coupler of the optical waveguide, is used to perform pupil redistribution on a portion of the light corresponding to the image before the portion of the light reaches the output-coupler. The method also includes using the output-coupler of the optical waveguide to couple, out of the optical waveguide, the light corresponding to the image that has traveled through the optical waveguide from the input-coupler to the output-coupler at least in part by way of TIR.

In accordance with certain embodiments, the display engine that is used to produce light corresponding to an image includes an illuminator, an image former and at least one collimating lens. The illuminator can include one or more light sources each of which is configured to emit narrowband light having a full width at half maximum (FWHM) bandwidth that is less than 10 nm. The image former can be configured to produce an image using the narrowband light produced by the illuminator. The at least one collimating lens can be arranged and configured to receive and collimate light corresponding to the image produced by the image former and direct the light corresponding to the image toward the input-coupler of the optical waveguide.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 10 illustrates a front view of an optical waveguide that supports a greater field of view (FOV) than the optical waveguides of the earlier FIGS.

DETAILED DESCRIPTION

Figure 1:
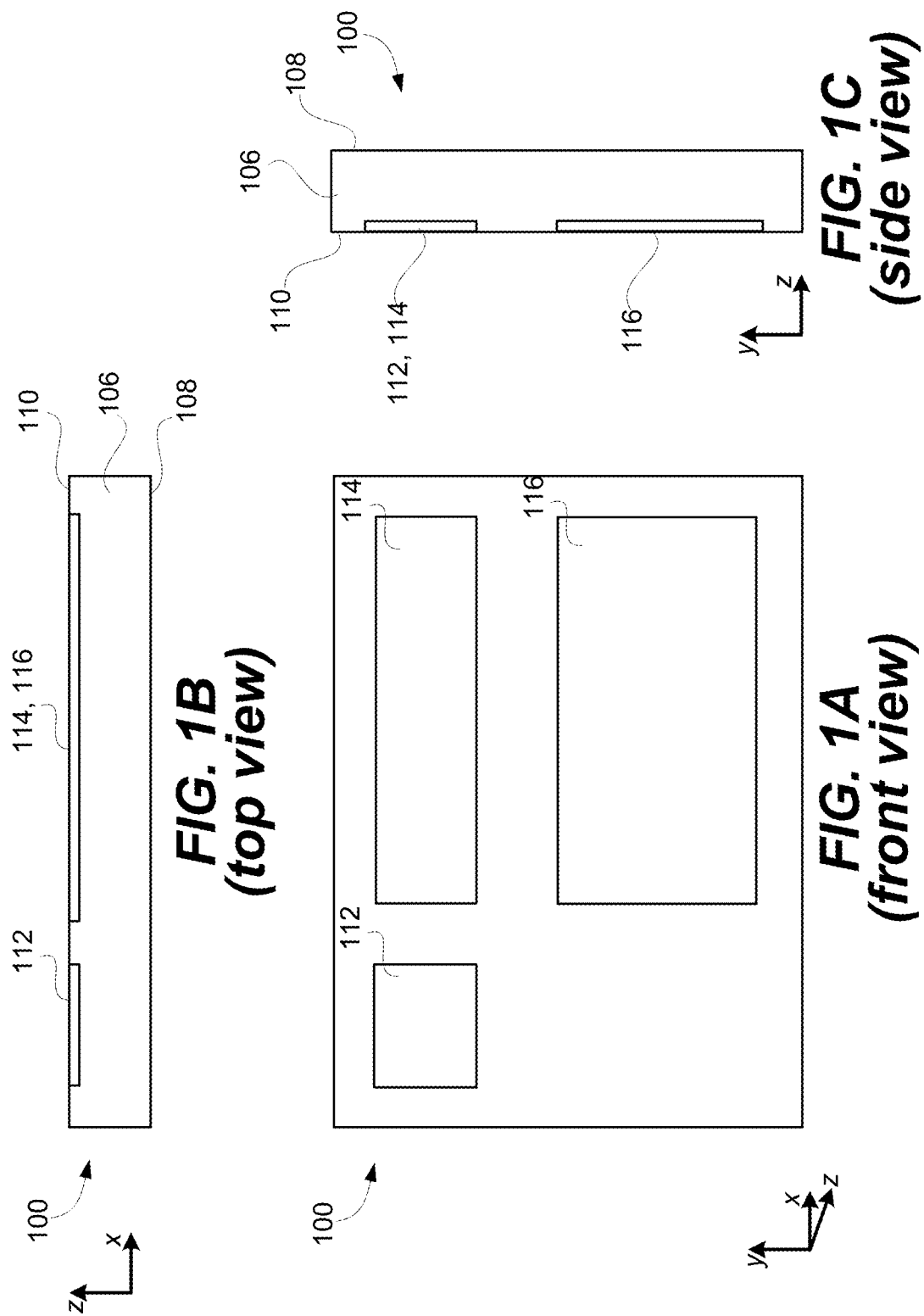
FIGS. 1A, 1B and 1C are front, top and side views, respectively, of an exemplary waveguide that can be used to replicate an image associated with an input-pupil to an expanded output-pupil.

Certain embodiments of the present technology relate to apparatuses for use in replicating an image associated with an input-pupil to an output-pupil. Such apparatuses can include a waveguide. As will be discussed in further details below, where waveguides are used to perform pupil replication (also referred to as image replication), non-uniformities in local and global intensities may occur, which may result in dark and light fringes and dark blotches when the replicated image is viewed, which is undesirable. Certain embodiments described herein can be used to improve intensity distributions, and thereby, can be used to improve the replicated image when viewed. More generally, embodiments of the present invention can be used to improve image uniformity.

In the description that follows, like numerals or reference designators will be used to refer to like parts or elements throughout. In addition, the first digit of a three digit reference number, or the first two digits of a four digit reference number, identifies the drawing in which the reference number first appears.

FIGS. 1A, 1B and 1C are front, top and side views, respectively, of exemplary optical waveguide 100 that can be used to replicate an image associated with an input-pupil to an expanded output-pupil. The term "input pupil," as used herein, refers to an aperture through which light corresponding to an image is overlaid on an input-coupler of a waveguide. The term "output pupil," as used herein, refers to an aperture through which light corresponding to an image exits an output-coupler of a waveguide. The optical waveguide 100 will often be referred to hereafter more succinctly simply as a waveguide 100. As will be discussed in further detail below with reference to FIG. 2, the image that the waveguide 100 is being used to replicate, and likely also expand, can be generated using a display engine.

Referring to FIGS. 1A, 1B and 1C, the optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the optical waveguide 100 from the input-coupler 112 to the output-coupler 116, out of the waveguide 100 so that the light is output and imaged from the output-pupil.

The bulk-substrate 106, which can be made of glass or optical plastic, but is not limited thereto, includes a first major surface 108 and a second major surface 110 opposite and parallel to the first major surface 108. The first major surface 108 can alternatively be referred to as the front-side major surface 108 (or more simply the front-side surface 108), and the second major surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 µm. In accordance with certain embodiments, the bulk-substrate 106 has a thickness of at least 25 µm between its major surfaces 108 and 110. In specific embodiments, the bulk-substrate 106 has a thickness (between its major surfaces) within a range of 25 µm to 1000 µm. The bulk-substrate 106, and more generally the waveguide 100, is transparent, meaning that it allows light to pass through it so that a user can see through the waveguide 100 and observe objects on an opposite side of the waveguide 100 than the user's eye(s).

The optical waveguide 100 in FIGS. 1A, 1B and 1C is also shown as including an intermediate-component 114, which can alternatively be referred to as an intermediate-zone 114. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion. In certain embodiments, the intermediate-component is configured as a fold-grating. In other embodiments, the intermediate-component is a mirror based component, rather than a grating based component.

The input-coupler 112, the intermediate-component 114 and the output-coupler 116 can be referred to collectively herein as optical components 112, 114 and 116 of the waveguide, or more succinctly as components 112, 114 and 116.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same surface (i.e., the back-side surface 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side surface 110 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 108, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major surfaces 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). Such DOEs can be produced using holographic processes, in which case, the DOEs can be more specifically referred to a holographic optical elements (HOEs). The input-coupler 112 can alternatively be implemented as a prism, a reflective polarizer or can be mirror based. Similarly, the output-coupler 116 can alternatively be implemented as a prism, a reflective polarizer or can be mirror based. Depending upon the specific configuration and implementation, any one of the input-coupler 112, the intermediate-component 114 and the output-coupler 116 can be reflective, diffractive or refractive, or a combination thereof, and can be implemented, e.g., as a linear grating type of coupler, a holographic grating type of coupler, a prism or another type of optical coupler. The intermediate-component 114, as noted above, can be implemented using a fold-grating, or can alternatively be implemented as a mirror based pupil expander, but is not limited thereto.

Where the input-coupler 112, the intermediate-component 114 and the output-coupler 116 are implemented in or on one (or both) of the surfaces 108 and/or 110 of the waveguide 100, one or more of them can be implemented as a surface grating, or more specifically, as a surface relief grating (SRG). A surface grating is a periodic structure in or on the surface of an optical component, such as a bulk-substrate 106. When the periodic structure is due to modulation of the surface itself, or a coating on the surface, it is referred to as a surface relief grating (SRG). An exemplary SRG includes uniform straight grooves in or on a surface of an optical component that are separated by uniform straight groove spacing regions. The nature of the diffraction by an SRG depends both on the wavelength of light incident on the grating and various optical characteristics of the SRG, such as line spacing, groove depth and groove slant angle. An SRG can be fabricated by way of a suitable microfabrication process, which may involve etching of and/or deposition on a substrate (e.g., the bulk-substrate 106) to fabricate a desired periodic microstructure in or on the substrate to form an optical component, which may then be used as a production master such as a mold or mask for manufacturing further optical components. An SRG is an example of a Diffractive Optical Element (DOE).

Where the input-coupler 112, the intermediate-component 114 and/or the output-coupler 116 is an SRG, each such SRG can be etched into one of the major surfaces 108 or 110 of the bulk-substrate 106. In such embodiments, the SRG can be said to be formed "in" the bulk-substrate 106. Alternatively, each SRG can be physically formed in an isotropic coating that covers one of the major surfaces 108 or 110 of the bulk-substrate 106, in which case each such SRG can be said to be formed "on" the bulk-substrate 106. Either way, the components 112, 114 and 116 are considered parts of the waveguide 100. In certain embodiments where the SRG(s) are formed in an isotropic coating, which covers one of the major surfaces 108 or 110 of the bulk-substrate 106, the isotropic coating in which the SRG(s) is/are formed has a same index of refraction as the bulk-substrate 106.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible and within the scope of embodiments of the present technology.

More generally, the input-coupler 112, the intermediate-component 114 and the output-coupler 116 can have various different outer peripheral geometries, can be provided in or on either of the major surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 114, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where
$\theta_c$ the critical angle for two optical mediums (e.g., the bulk-substrate 106, and air or some other medium that is adjacent to the bulk-substrate 106) that meet at a medium boundary,
n1 is the index of refraction of the optical medium in which light is traveling towards the medium boundary (e.g., the bulk-substrate 106, once the light is couple therein), and
n2 is the index of refraction of the optical medium beyond the medium boundary (e.g., air or some other medium adjacent to the bulk-substrate 106).

The concept of light traveling through the waveguide 100, from the input-coupler 112 to the output-coupler 114, by way of TIR, can be better appreciated from FIG. 2, which is discussed below. Referring now to FIG. 2, as in FIG. 1C, FIG. 2 shows a side view of the waveguide 100, but also shows a display engine 204 that generates an image including angular content that is coupled into the waveguide by the input-coupler 112. Also shown in FIG. 2, is representation of a human eye 214 that is using the waveguide 100 to observe an image, produced using the display engine 204, as a virtual image.

The display engine 204 can include, e.g., an image former 206, a collimating lens 208 and an illuminator 210, but is not limited thereto. The image former 206 can be implemented using a transmissive projection technology where a light source is modulated by an optically active material, and backlit with white light. These technologies are usually implemented using liquid crystal display (LCD) type displays with powerful backlights and high optical energy densities. The illuminator 210 can provide the aforementioned backlighting. The image former 206 can also be implemented using a reflective technology for which external light is reflected and modulated by an optically active material. Digital light processing (DLP), liquid crystal on silicon (LCOS) and Mirasol® display technology from Qualcomm, Inc. are all examples of reflective technologies. Alternatively, the image former 206 can be implemented using an emissive technology where light is generated by a display, see for example, a PicoP™ display engine from Microvision, Inc. Another example of emissive display technology is a micro organic light emitting diode (OLED) display. Companies such as eMagin and Microoled provide examples of micro OLED displays. The image former 206, alone or in combination with the illuminator 210, can also be referred to as a micro display. The collimating lens 208 is arranged to receive a diverging display image from the image former 206, to collimate the display image, and to direct the collimated image toward the input-coupler 112 of the waveguide 100. In accordance with an embodiment, an entry pupil associated with the waveguide may be approximately the same size as an exit pupil associated with the image former 206, e.g., 5 mm or less in some embodiments, but is not limited thereto. While the collimating lens 208 is illustrated as a single lens in the FIGS., the display engine 204 can actually include multiple lenses, and more generally, one or more lens groups. Further, in FIG. 2, the collimating lens 208 is represented as a biconvex lens, but that is just for illustration. The display engine 204 can include additional and/or alternative type(s) of lens(es), including, but not limited to, one or more piano-convex, positive meniscus, negative meniscus, plano-concave, biconvex and/or biconcave type lens, just to name a few.

In FIG. 2, the display engine 204 is shown as facing the back-side surface 110 of the waveguide 100, and the eye 214 is shown as facing the front-side surface 108 opposite and parallel to the back-side surface 110. This provides for a periscope type of configuration in which light enters the waveguide on one side of the waveguide 100, and exits the waveguide at an opposite side of the waveguide 100. Alternatively, the input-coupler 112 and the output-coupler 116 can be implemented in a manner such that the display engine 204 and the eye 214 are proximate to and face a same major surface (108 or 110).

The waveguide 100 can be incorporated into a see-through mixed reality display system, but is not limited to use therewith. A separate instance of the waveguide 100 and the display engine 204 can be provided for each of the left and right eyes of a user. In certain embodiments, such waveguide(s) 100 may be positioned next to or between see-through lenses, which may be standard lenses used in eye glasses and can be made to any prescription (including no prescription). Where a see-through mixed reality display system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art. In certain embodiments, a separate waveguide is provided for each separate color (e.g., red, green and blue) that is used to produce an image. In such embodiments, three waveguides (used for separately guiding red, green and blue light corresponding to an image) can be stacked, back-to-back, to provide a waveguide assembly. Such a waveguide assembly, or individual waveguides thereof, are examples of optical structures that are configured to utilize total internal reflection (TIR) to transfer light corresponding to an image from an input-pupil to an output-pupil where the image can be viewed by a human eye. As explained above, such waveguides can also be used to provide pupil expansion. It is also possible that a single waveguide can be used to transfer light or multiple colors (e.g., two or more of red, green and blue) corresponding to an image from an input-pupil to an output-pupil where the image can be viewed by a human eye.

Figure 3:
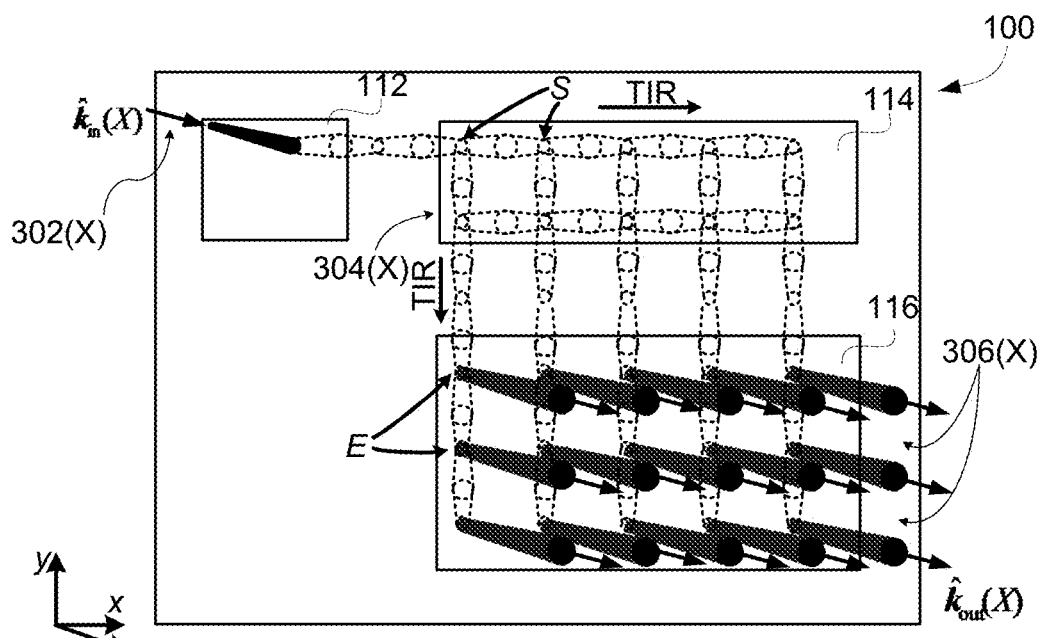
FIG. 3, which is similar to FIG. 1A because it provides a front view of the waveguide, is used to explain how light that is coupled into the waveguide by an input-coupler, travels by way of total internal reflection (TIR) from the input-coupler to an intermediate-component, and by way of TIR from the intermediate-component to an output-coupler, where it exits the waveguide.

FIG. 3, which is similar to FIG. 1A in that it provides a front view of the waveguide 100, will now be used to explain how light that is coupled into the waveguide 100 by the input-coupler 112, can travel by way of TIR from the input-coupler 112 to the intermediate-component 114, and by way of TIR from the intermediate-component 114 to the output-coupler 116, where it exits the waveguide 100. More specifically, as explained in more detail below, a combination of diffractive beam splitting and TIR within the waveguide 100 results in multiple versions of an input beam of light 302(X) being outwardly diffracted from the output-coupler 116 in both the length and the width of the output-coupler 116 as output beams 306(X) in respective outward directions (that is, away from the waveguide 100) that substantially match the respective inward direction $\hat{k}_{in}(X)$ of the corresponding input beam 302(X).

In FIG. 3, beams external to (e.g., entering or exiting) the waveguide 100 are represented using shading and dotted lines are used to represent beams within (i.e., internal to) the waveguide 100. Perspective is used to indicate propagation in the z-direction (i.e., towards or way from a user), with widening of the beams in FIG. 3 representing propagation in the positive z (i.e., +z) direction (that is towards the user). Thus, diverging dotted lines represent beams within the waveguide propagating towards the front-side major surface 108 of the waveguide 100, with the widest parts (shown as large dotted circles) represent those beams striking the front-side major surface 108 of the waveguide 100, from which they are totally internally reflected back towards the back-side major surface 110 of the waveguide 100, which is represented by the dotted lines converging from the widest points to the narrowest points (shown as the small dotted circles) at which they are incident on the back-side major surface 110 of the waveguide 100.

Exemplary regions where a beam is incident on the intermediate-component 114 and splits into two beams, one of which travels in the horizontal direction and the other one of which travels in the vertical direction, are labeled S (for split or splitting). Exemplary regions where a beam is incident on the output-coupler 116 and exits the waveguide 100 are labeled E (for exit or exiting).

As illustrated, the input beam 302(X) is coupled into the waveguide 100, e.g., by way of diffraction, by the input-coupler 112, and propagates along a width of the input-coupler by way of TIR in the horizontal direction. This results in the beam 302(X) eventually striking the intermediate-component 114 at a left-most splitting region (S). When the beam 302(X) is incident at the left-most splitting region (S), that incident beam 302(X) is effectively split in two, e.g., by way of diffraction. This splitting creates a new version of that beam 304(X) (specifically a first-order diffraction mode beam) which is directed in a generally downwards vertical (−y) direction towards the output-coupler 116, in addition to a zero-order diffraction mode beam (i.e. unaffected by the diffractive component) that continues to propagate along the width of the intermediate-component 114 in the horizontal (+x) direction, just as the beam would in the absence of the intermediate-component 114 (albeit at a reduced intensity). Thus, a portion of the beam effectively continues to propagate along substantially the whole width of the intermediate-component 114, striking the intermediate-component 114 at various splitting regions (S), with another new version of the beam (in the same downward direction) created at each splitting region (S). As shown in FIG. 3, this results in multiple versions of the beam being directed toward, and incident on, the output-coupler 116, with the multiple versions of the beam being horizontally separated so as to collectively span substantially the width of the output-coupler 116.

As also shown in FIG. 3, each new version of the beam as created at a splitting region (S) may itself strike the intermediate-component 114 (e.g., a fold grating) during its downward propagation. This can result in a splitting of the new version of the beam, e.g., by way of diffraction, to create a further new version of that beam that is directed in a horizontal (+x) direction (which is a first-order diffraction mode beam), in addition to a zero-order diffraction mode beam that continues to propagate in the downward vertical (−y) direction. This phenomenon may repeat numerous times within the waveguide, as can be appreciated from FIG. 3. FIG. 3 is not drawn to scale, as many more reflections and splitting of beams are likely to occur than illustrated in FIG. 3, e.g., as can be better appreciated from FIG. 4.

In FIG. 3, the output-coupler 116 is shown as being located below the intermediate-component 114, and thus, the downward-propagating versions of the beams will eventually be incident on the output-coupler 116, at which they are guided onto the various exit regions (E) associated with the output-coupler 116. The output-coupler 116 is configured so that when a version of the beam strikes the output-coupler, that beam is diffracted to create a first-order diffraction mode beam directed outwardly from the output-coupler 116, in an outward direction that substantially matches the unique inward direction in which the original beam 302(X) corresponding to an image point X was input. Because there are multiple versions of the beam propagating downwards that substantially span the width of the output-coupler 116, multiple output beams 306(X) are generated across the width of the output-coupler 116 (as shown in FIG. 3) to provide effective horizontal beam expansion, which can also be referred to as horizontal pupil expansion.

Moreover, the output-coupler 116 is configured so that, in addition to the outwardly diffracted beams 306(X) being created at the various exit regions (E) from an incident beam, a zero-order diffraction mode beam continues to propagate downwards in the same specific direction as that incident beam. This, in turn, strikes the output-coupler 116 at lower portions thereof in the manner illustrated in FIG. 3, resulting in both continuing zero-order and outward first-order beams. Thus, multiple output beams 306(X) are also generated across substantially the entire height of the output-coupler 116 to provide effective vertical beam expansion, which can also be referred to as vertical pupil expansion.

The output beams 306(X) are directed outwardly in outward directions that substantially match the unique input direction in which the original beam 302(X) is inputted. In this context, substantially matching means that the outward direction is related to the input direction in a manner that enables a user's eye to focus any combination of the output beams 306(X) to a single point on the retina, thus reconstructing the image point X from which the original beam 302(x) propagated or was otherwise emitted.

For a planar waveguide (i.e., a waveguide whose frontside and back-side major surfaces lie substantially parallel to the xy-plane in their entirety), the output beams 306(S) are substantially parallel to one another and propagate outwardly in an output propagation direction $\hat{k}_{out}(X)$ that is parallel to the unique inward direction $\hat{k}_{in}(X)$ in which the corresponding input beam 302(X) was directed to the input-coupler 112. That is, directing the beam 302(X) corresponding to the image point X to the input-coupler 112 in the inward direction $\hat{k}_{in}(X)$ causes corresponding output beams 306(X) to be directed (e.g., diffracted) outwardly and in parallel from the output-coupler 116, each in an outward propagation direction $\hat{k}_{out}(X)=\hat{k}_{in}(X)$ due to the configuration of the waveguide 100.

In the exemplary implementation described above, the intermediate-component 114 (e.g., a fold grating) is configured to provide horizontal pupil expansion, also referred to as effective horizontal beam expansion; and the output-coupler 116 is configured to provide vertical pupil expansion, also referred to as effective vertical beam expansion. Alternatively, the intermediate-component 114 can be repositioned, e.g., below the input-coupler 112 and to the side of the output-coupler 116, and the components 112, 114 and 116 can be reconfigured such that the intermediate-component 114 is configured to provide vertical pupil expansion, and the output-coupler 116 is configured to provide horizontal pupil expansion, as was noted above.

Figure 2:
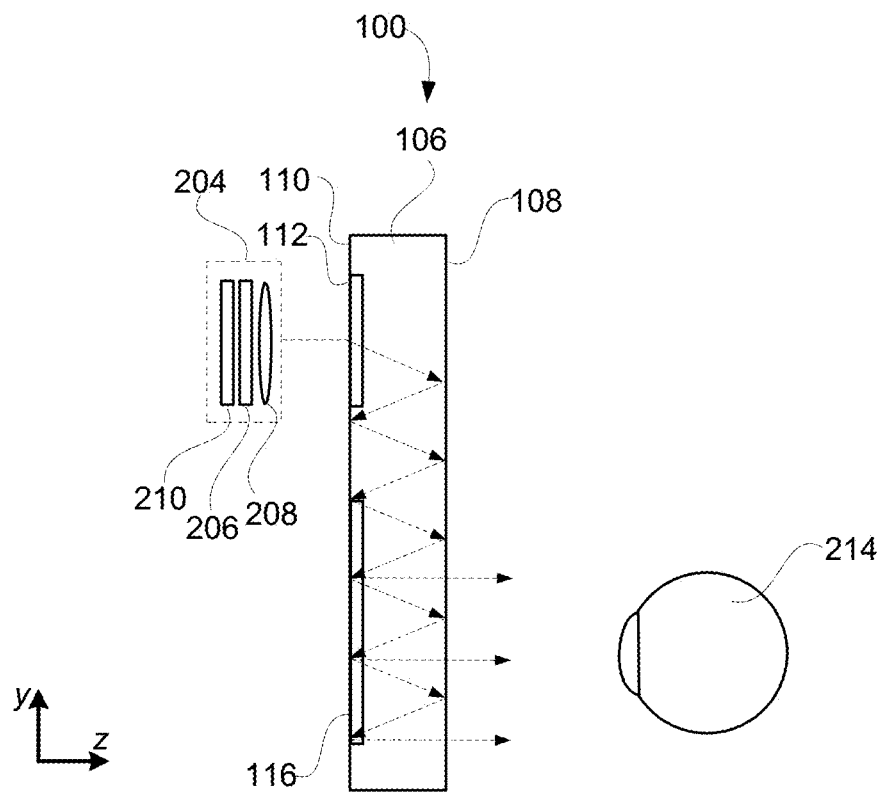
FIG. 2 is side view of the exemplary waveguide introduced with reference to FIGS. 1A, 1B and 1C, and also shows a display engine that generates an image including angular content that is coupled into the waveguide by an input-coupler, and also shows an eye that is viewing the image within an eyebox that is proximate the output-coupler.

The exemplary waveguide 100 shown in and described with reference to FIGS. 1-3 is for use in an imaging system that relies on pupil replication. In such systems, i.e., systems that rely on pupil replication, the output pupils are preferably uniformly overlapping for all angles. When this is not the case, e.g., because pupils are spaced too far apart from one another, angular-dependent spatial-non-uniformities in intensity arise, which manifest themselves as bright and dark image artifacts, which are undesirable.

Referring back to FIG. 2, the illuminator 210 can include one or more light emitting elements, each of which can also be referred to as a light source. For example, the illuminator 210, which can also be referred to as a light source assembly, can include red, green and/or blue light sources that are configured to respectively produce red light within a corresponding red wavelength range, green light within a corresponding green wavelength range and blue light within a corresponding blue wavelength range. For a more specific example, the illuminator 210 can include wideband red, green and blue light emitting diode (LEDs). Wideband, as the term is used herein, refers to light having a full width at half maximum (FWHM) bandwidth that is greater than 10 nm, and is likely to have an FWHM bandwidth of at least 30 nm.

Figure 4A:
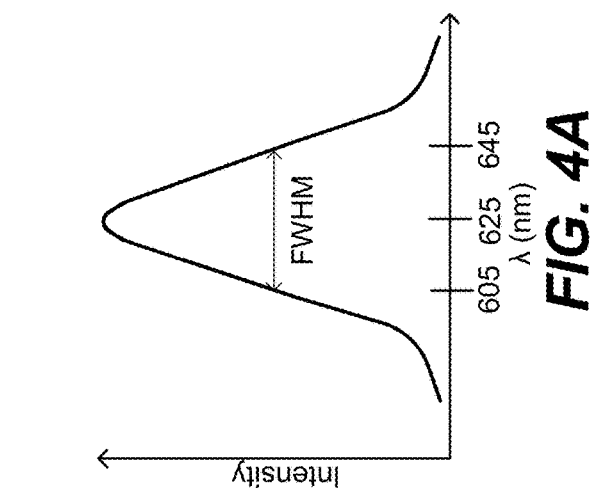
FIG. 4A is a graph of the spectral characteristics of red light emitted by an exemplary wideband red light source, such as a red light emitting diode (LED).

A wideband red LED can, for example, have a FWHM bandwidth from ~605 nm to ~645 nm, with an emission peak at ~625 nm. The spectral characteristics of red light emitted by such an exemplary wideband red LED is illustrated in the graph of FIG. 4A. A wideband green LED can, for example have a FWHM bandwidth from ~505 nm to ~545 nm, with an emission peak at ~525 nm. A graph of the spectral characteristics of green light emitted by such a wideband green LED could resemble the graph in FIG. 4A, but with the emission peak shifted down to ~525 nm. A wideband blue LED can, for example, have a FWHM bandwidth from ~435 nm to ~475 nm, with an emission peak at ~455 nm. A graph of the spectral characteristics of blue light emitted by such a wideband blue LED could resemble the graph in FIG. 4A, but with the emission peak shifted down to ~455 nm. These are just examples, which are not intended to be limiting.

Figure 5A:
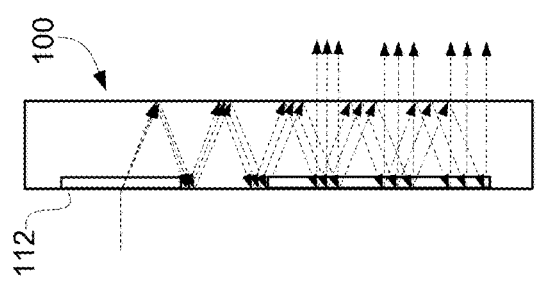
FIG. 5A, which shows a side view of an optical waveguide, illustrates how a diffractive input-coupler of the waveguide causes wideband light incident thereon (which may be produced by the wideband light source that produces the light having the spectral characteristics shown in FIG. 4A) is dispersed into multiple wavelengths that each propagate by way of TIR at a respective different angle within the waveguide.

Referring back to FIG. 2 again, the collimating lens 208 causes each pixel of an image, produced by the image former 206, to be a collimated pupil that is coupled into the waveguide 100 and then expanded using pupil replication in the waveguide at each TIR. Even relatively small pupils (e.g., on the order of 3 mm to 4 mm in diameter) can produce substantially uniform images (as viewed by an eye 214 within an eyebox) when the illuminator 210 includes wideband light sources, such as LEDs. This is because LEDs have a relatively wide spectral bandwidth (e.g., on the order of about 20 nm to 40 nm) and every wavelength (within the relatively wide spectral bandwidth) propagates at a different angle within the waveguide. More specifically, when wideband light emitted by a wideband light source is incident on a diffractive grating type input-coupler (e.g., 112), the diffracting grating disperses (i.e., separates) the wideband light into multiple wavelengths that each propagate at a respective different angle within the waveguide, as illustrated in FIG. 5A. In other words, FIG. 5A illustrates how a diffractive input-coupler 112 causes the wideband light incident thereon to be dispersed into multiple wavelengths that each propagate by way of TIR at a respective different angle within the waveguide 100. A diffractive grating type intermediate-coupler (e.g., 114) and a diffractive grating type output-coupler (e.g., 116) also cause similar dispersion of the wideband light.

Figure 6A:
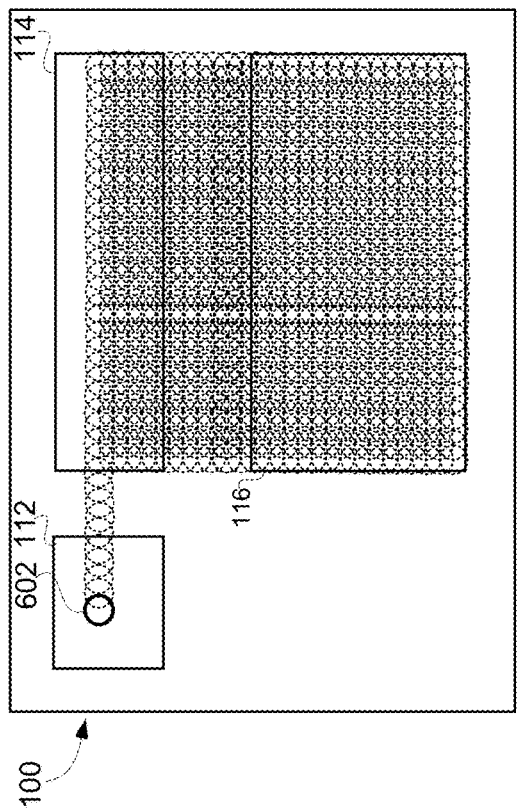
FIG. 6A conceptually illustrate how a pupil is replicated within an optical waveguide as light produced by a wideband light source (which may be produced by the wideband light source that produces the light having the spectral characteristics shown in FIG. 4A) travels by way of TIR from an input-coupler to an intermediate-component, and by way of TIR from the intermediate-component to an output-coupler, where it exits the waveguide.

FIG. 6A is used to conceptually illustrate how a pupil, represented by the solid-lined circle 602, is replicated, as light produced by a wideband light source (e.g., an LED) travels by way of TIR from the input-coupler 112 to the intermediate-component 114, and by way of TIR from the intermediate-component 114 to the output-coupler 116, where it exits the waveguide 100. In FIG. 6A, each of the dotted-lined circles represents a replication of the pupil 602, which may also be referred to simply as a pupil. While represented as circles in FIG. 6A, each pupil is actually a collection of angles. When light exits the waveguide 100, proximate the output-coupler 116, a human eye, which has a lens in it, receives the collection of angles associated with a pupil and coverts it back to an image, e.g., the image produced by the display engine 204 in FIG. 2. Where the waveguide 100, and more specifically the components 114 and/or 116 thereof is/are configured to perform pupil expansion, when an expanded pupil and is converted to an image (by the lens of a human eye), the resulting image is expanded relative to the original image (e.g., produced by the display engine 204 in FIG. 2).

In FIG. 6A, the pupils substantially evenly overlap one another, which beneficially results in smooth pupil filling of the eyebox (proximate the output-coupler 116) from which a human eye 214 can view the image. The wide bandwidth of the LED type light source contributes to the overlap of the pupils and the smooth pupil filling of the eyebox. In other words, the use of one or more LEDs as the light source(s) of the illuminator 210 contributes to a substantially even pupil distribution being provided, which beneficially provides for a substantially uniform intensity distribution in the image.

While wideband LEDs are relatively inexpensive and readily available, there are certain benefits to using narrowband light sources, such as narrowband laser diodes (LDs), instead of wideband LEDs to implement the illuminator 210. For example, narrowband LDs produce more collimated and coherent light than wideband LEDs, can provide higher output power than wideband LEDs, can produce linearly polarized light, and may enable better optimization of an overall imaging system. Narrowband, as the term is used herein, refers to light having a FWHM bandwidth that is less than 10 nm, and is likely to have an FWHM bandwidth of less than 5 nm (e.g., 2 nm or less). Additionally, certain types of display technology, such as MEMs scanning display technology, require that narrowband light sources be used. Further, narrowband light sources can be integrated into assemblies that typically weigh less than those required for the integration of wideband LEDs, which is advantageous where the light sources are included in a portable device. Also, where a narrowband LD produces linearly polarized light, such light can provide for a higher coupling efficiency when a DOE or other coupler is configured to have a preferential polarization state.

Figure 4B:
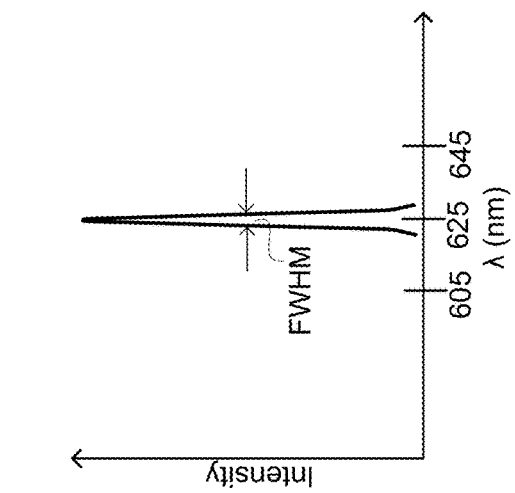
FIG. 4B is a graph of the spectral characteristics of red light emitted by an exemplary narrowband red light source, such as a red laser diode (LD).

A narrowband light source can include, e.g., a laser diode (LD), a super luminescent light emitting diode (SLED), or a quantum dot light emitting diode (QD-LED), or some other light emitter element that emits light having a FWHM bandwidth that is less than 10 nm. A graph of the spectral characteristics of red light emitted by an exemplary narrowband red LD is shown in FIG. 4B. A graph of the spectral characteristics of green light emitted by an exemplary narrowband green LD could resemble the graph in FIG. 4B, but with the emission peak shifted down to ~525 nm. A graph of the spectral characteristics of blue light emitted by an exemplary narrowband blue LD could resemble the graph in FIG. 4B, but with the emission peak shifted down to ~455 nm. These are just examples, which are not intended to be limiting.

As noted above, the collimating lens 208 of a display engine 204 causes each pixel of an image, produced by the image former 206, to be a collimated pupil that is coupled into the waveguide 100 and then expanded using pupil replication in the waveguide at each TIR. However, where the illuminator 210 is implemented using one or more LDs or other narrowband light source(s), the pupil distribution may be much more spread out and less uniform than is the case where the illuminator 210 is implemented using one or more LEDs or other wideband light source(s). The reasons for this can be appreciated from FIGS. 5B and 5C.

Figure 5B:
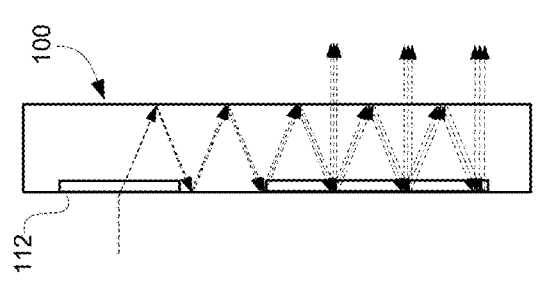
FIG. 5B, which shows a side view of an optical waveguide, illustrates how a diffractive input-coupler of the waveguide causes relatively minimal dispersion of narrowband light incident thereon (which may be produced by the narrowband light source that produces the light having the spectral characteristics shown in FIG. 4B), and thus, separation into relatively few wavelengths that each propagate by way of TIR at a respective different angle within the waveguide.

Referring to FIG. 5B, in contrast to when wideband light emitted by a wideband light source is incident on a diffractive grating type input-coupler (e.g., 112), when narrowband light emitted by a narrowband light source is incident on a diffractive grating type input-coupler (e.g., 112), the diffracting grating only minimally disperses (i.e., separates) the narrowband light into relative few wavelengths that each propagate at a respective different angle within the waveguide, as illustrated in FIG. 5B. In other words, FIG. 5B illustrates how a diffractive input-coupler 112 causes narrowband light incident thereon to be only minimally dispersed into relatively few wavelengths that each propagate by way of TIR at a respective different angle within the waveguide 100. A diffractive grating type intermediate-coupler (e.g., 114) and a diffractive grating type output-coupler (e.g., 116) also cause similar minimal dispersion of the narrowband light.

Figure 6B:
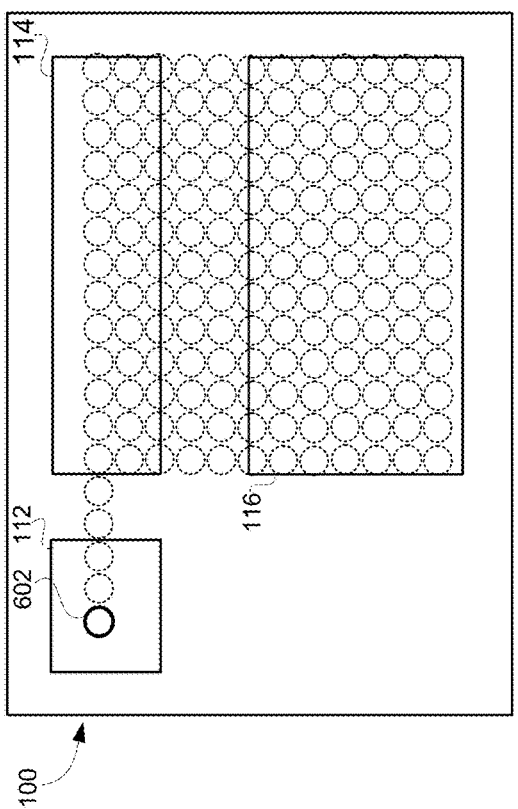
FIG. 6B conceptually illustrate how a pupil is replicated within an optical waveguide as light produced by a narrowband light source (which may be produced by the narrowband light source that produces the light having the spectral characteristics shown in FIG. 4B) travels by way of TIR from an input-coupler to an intermediate-component, and by way of TIR from the intermediate-component to an output-coupler, where it exits the waveguide.

FIG. 6B is used to conceptually illustrate how a pupil, represented by the solid-lined circle 602, is replicated, as light produced by a narrowband light source (e.g., an LD) travels by way of TIR from the input-coupler 112 to the intermediate-component 114, and by way of TIR from the intermediate-component 114 to the output-coupler 116, where it exits the waveguide 100. In FIG. 6B, each of the dotted-lined circles represents a replication of the pupil 602, which may also be referred to simply as a pupil.

In FIG. 6B, the pupils are spread out and do not overlap one another, which detrimentally results in non-smooth pupil filling of the eyebox (proximate the output-coupler 116) from which a human eye 214 can view the image. Indeed, in FIG. 6B there are gaps between adjacent pupils represented by the dotted-lined circles. The narrow bandwidth of light emitted by an LD type light source contributes to the lack of overlap of the pupils and the non-smooth pupil filling of the eyebox. In other words, the use of one or more LDs as the light source(s) of the illuminator 210 can provide for a substantially uneven pupil distribution, which undesirably provides for a non-uniform intensity distribution in the image.

Figure 7:
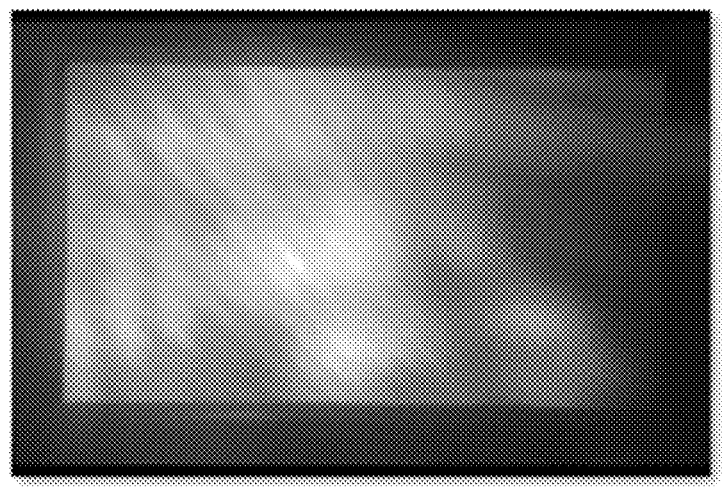
FIG. 7 is used to illustrate non-uniformities in local and global intensities which may occur when performing imaging, and more specifically pupil replication, using an optical waveguide.

FIG. 7 is used to generally illustrate the result of non-uniformities in local and global intensity which may occur when performing imaging using an optical waveguide, wherein the non-uniformities can occur due to non-uniform pupil distribution. More specifically, the dark and light generally diagonal fringes are illustrative of non-uniformities in local intensity that occur due to the pupil distribution being non-uniform. Such non-uniformities can be seen as color non-uniformity and image noise to a viewer.

Embodiments of the present technology reduce and preferably remove the pupil replication problems induced by narrowband light sources, such as LDs, and more generally, induced when small pupils are being replicated. More specifically, certain embodiments of the present technology utilize a waveguide architecture where light is diffracted by an added diffractive grating an even or add number of times in order to achieve a pupil replication that fills in the gaps between adjacent replicated pupils described above with reference to FIG. 6B. If designed appropriately, using the grating equation, virtually any grating period and grating orientation (i.e., grating angle) can be used since a deflection of an angle will be compensated by the next diffraction, as long a majority of power is diffracted in the diffraction orders 0 and n, where m can be any even or odd integer. In accordance with certain embodiments, the diffraction orders are primarily limited to the zero-order, and the positive and/or negative first-order, so as to mitigate the possibility of ghost images.

In accordance with specific embodiments of the present technology, by designing the additional diffractive element in a proper way, part of the power of a pupil can be diffracted into a new direction into the diffraction order m, while keeping the rest of the power of the pupil propagating at the original direction in the zero-diffractive order. Since the diffracted part of the pupil moves sideways, the size of the pupil is effectively increased. However, with the next diffraction the diffracted power is re-diffracted and propagated at the original direction. By targeting the diffracted direction to fill in the gaps between adjacent pupils, a uniform pupil distribution can be achieved that mitigates dark regions that may otherwise appear in an image viewed from the eyebox.

Figure 8A:
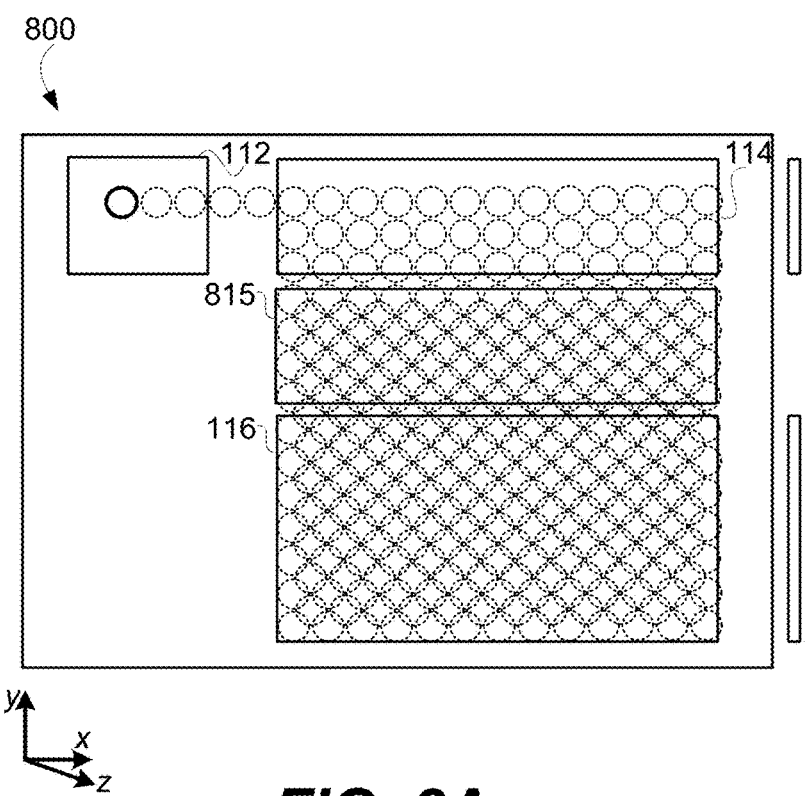
FIG. 8A illustrates a front view of an optical waveguide according to an embodiment of the present technology.

An example of this approach is shown in FIG. 8A, which illustrates a front view of an optical waveguide 800. The waveguide 800 in FIG. 8A is similar to the waveguide 100 discussed above with reference to many of the previously discussed FIGS. However, a comparison between, for example, the waveguide 100 depicted in FIG. 6B and the waveguide 800 depicted in FIG. 8A shows that the waveguide 800 includes an additional optical component 815, which will often be referred to herein as a second intermediate-component 815. In other words, the waveguide 800 is similar to the waveguide 100, except the waveguide 800 includes an additional intermediate-component 815 located between the intermediate-component 114 and the output-coupler 116. When discussing FIG. 8A, the intermediate-component 114 will often be referred to as the first intermediate-component.

Referring to FIG. 8A, the optical waveguide 800 is shown as including an input-coupler 112, a first intermediate-component 114, a second intermediate-component 815 and an output-coupler 116. The input-coupler 112 of the optical waveguide 800 is configured to couple, into the optical waveguide 800 (and more specifically, the bulk substrate thereof), light corresponding to an image associated with the input-pupil (e.g., produced by the display engine 204) and configured to direct the light corresponding to the image toward the first intermediate-component 114. The first intermediate-component 114 is configured to perform one of horizontal or vertical pupil expansion on the light corresponding to the image that is directed toward the first intermediate-component 114 by the input-coupler 112 and configured to redirect the light corresponding to the image toward the output-coupler 116. The second intermediate-component 815 is a diffractive component located between the first-intermediate component 114 and the output-coupler 116 and is configured to perform pupil redistribution on a portion of the light corresponding to the image before the portion of the light reaches the output-coupler 116. Unless stated otherwise, the second intermediate-component 815 can be provided in or on either one of the major surfaces of bulk-substrate of an optical waveguide, or embedded therebetween. The output-coupler 116 is configured to perform the other one of horizontal or vertical pupil expansion and configured to couple, out of the optical waveguide 800, the light corresponding to the image that has traveled through the optical waveguide 800 from the input-coupler 112 to the output-coupler 116 at least in part by way of TIR.

The second intermediate-component 815 diffracts and thereby interacts with the light corresponding to the image travelled by way of TIR from the first intermediate-component 114 to the output-coupler 116. In accordance with specific embodiments, the first intermediate-component 114 is a diffractive optical element (DOE) configured to cause both zero-order diffraction and at least one of positive or negative first-order diffraction, as can be appreciated from the discussion of FIG. 3 above. Similarly, the second intermediate-component 815 is a DOE configured to cause both zero-order diffraction and at least one of positive or negative first-order diffraction. However, in accordance with certain embodiments of the present technology, the angle of diffraction associated with the first-order diffractions caused by the second intermediate-component 815 will differ from the angle of diffraction associated with the first-order diffractions caused by the first intermediate-component 114 due to the grating spacing and/or grating orientation being different in the second intermediate-component 815 than in the first intermediate-component 114.

In accordance with certain embodiments of the present technology, the second intermediate-component 815 is configured to cause the light that is output from the optical waveguide 800 by the output-coupler 116 to have a more uniform intensity distribution compared to if the second intermediate-component 815 were absent and the light corresponding to the image travelled by way of TIR from the first intermediate-component 114 to the output-coupler 116 without interacting with the second intermediate-component 815. More specifically, the second intermediate-component 815 is configured to increase overlap of pupils that are replicated within the waveguide 800 compared to if the second intermediate-component 815 were absent. This increase in pupil overlap can be appreciated by comparing the replicated pupils (represented by dotted lined circles) in the waveguide 100 shown in FIG. 6B, where there is no second intermediate-component, to the replicated pupils (represented by dotted lined circles) in the waveguide 800 shown in FIG. 8A which includes the second intermediate-component 815.

The waveguide 800 is especially useful in a near-eye or heads-up display system that includes a display engine (e.g., 204) configured to output light corresponding to an image, wherein the display engine includes an illuminator (e.g., 210) having one or more light sources each of which is configured to emit narrowband light having a FWHM bandwidth that is less than 10 nm, e.g., as shown in and described above with reference to FIG. 4B. This is because, as described above with reference to FIGS. 5B and 6B, such narrowband light may result in small pupils that when replicated have gaps between adjacent replicated pupils, as represented in FIG. 6B, which gaps cause a non-uniform intensity distribution when the image is viewed from an eyebox proximate the output-coupler 116 of the optical waveguide 800. More specifically, if the second intermediate-component 815 were not included within the optical waveguide 800, the narrowband light produced by the source(s) of the illuminator (e.g., 210) of the display engine (e.g., 204) would likely result in gaps between adjacent replicated pupils which would cause a non-uniform intensity distribution when the image is viewed from an eyebox proximate the output-coupler 116 of the optical waveguide 800.

In accordance with certain embodiments of the present technology, the second intermediate-component 815 diffracts and thereby interacts with the light corresponding to the image travelled by way of TIR from the first intermediate-component 114 to the output-coupler 116. Preferably, the second intermediate-component 815 is configured to cause both zero-order diffraction and at least one of positive or negative first-order diffraction. The zero-order diffractions caused by the second intermediate-component 815 results in a portion of the light corresponding to the image that is traveling from the first-intermediate component 114 to the output-coupler 116 continuing in a same direction that that light was traveling when it was incident on the second intermediate-component 815. In other words, the zero-order diffractions caused by the second intermediate-component 815 essentially result in a portion of the light traveling in the same manner that the portion of the light would if the second intermediate-component 815 was not there. On the other hand, the zero-order diffractions caused by the second intermediate-component 815 results in a further portion of the light corresponding to the image that is traveling from the first intermediate-component 114 to the output-coupler 116 to be diffracted in a new direction, e.g., sideways, which has an effect of increasing the size of the pupils being replicated. Explain another way, by designing the second intermediate-component 815 in a proper way, part of the power of a pupil is deflected in a new direction into a diffractive order m, and the remaining part of the power of the pupil continues to propagate in its original direction. Then, with the next diffraction caused by the second intermediate-component 815, the diffracted power is re-diffracted and propagated at the original direction.

In accordance with certain embodiments of the present technology, the grating equation $m\lambda = d \sin(\sin\theta i \pm \sin\theta r)$ is used to design the second intermediate-component 815, where m is the diffractive order (e.g., m=±0, 1, . . . k, where k is a small integer), $\lambda$ is the wavelength of light incident on the grating, d is the grating period, $\theta i$ is the angle of incidence of light onto the grating, and $\theta r$ is the angle at which light is reflected from the grating. More specifically, using the grating equation, a diffraction direction is targeted to fill in gaps between adjacent pupils to obtain a more uniform pupil distribution.

As noted above, initially in the discussion of FIGS. 1A, 1B and 1C, in certain embodiments described herein one or more of the input-coupler 112, the intermediate-component 114 (often referred to as the first intermediate-component 114) and the output-coupler 116 can be implemented as an SRG. Similarly, the second intermediate-component 815, and other DOEs described herein, can be implemented as SRGs. Such SRGs can all be located in or on the same one of the major planar surfaces (e.g., 108 or 110) of the bulk-substrate (e.g., 106) of an optical waveguide (e.g., 100). Referring, for example, to FIG. 8A, it is also possible that at least one of the input-coupler 112, the first intermediate-component 114, the second intermediate-component 815 or the output-coupler 116 is an SRG formed in or on one of the major planar surfaces (e.g., 108) of the bulk-substrate 106, while at least one other one of the input-coupler 112, the first intermediate-component 114, the second intermediate-component 815 or the output-coupler 116 is an SRG formed in or on the other one of the major planar surfaces (e.g., 110) of the bulk-substrate 106.

Figure 8B:
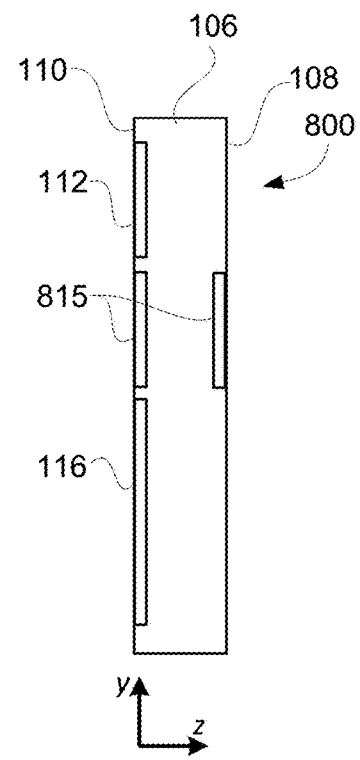
FIG. 8B is an exemplary side view of the optical waveguide whose front view is shown in FIG. 8A.

In certain embodiments of the present technology, any one or more of an input-coupler, an intermediate-component or an output-coupler can be implemented as a double-sided SRG, or more generally, as a double-sided DOE. For example, referring to FIG. 8B, which is an exemplary side view of the waveguide 800 introduced with reference to FIG. 8A, the second intermediate-component 815 is shown as being implemented as a double-sided DOE that includes SRGs in both the major surfaces 108 and 110 of the bulk substrate of the waveguide.

Where the second-intermediate component (e.g., 815) and/or some other optical element of a waveguide is implemented as a double-sided DOE, the grating period and orientation of each DOE, of a pair of DOEs associated with the double-sided DOE, may be precisely matched so as to not adversely affect the modulation transfer function (MTF) of the imaging system and/or produce double imaging. For example, for the second intermediate component 815, the grating period and orientation of the DOE included in or on the major surface 108 may be precisely matched to (i.e., the same as) the grating period and orientation of the DOE included in or on the other major surface 110.

One of the benefits of an intermediate-component (e.g., 815) being implemented as a double-side DOE is that it should provide for increased pupil redistribution compared to if the intermediate-component were a single-sided DOE. This is because a double-sided DOE will diffract and thereby interact with light corresponding to an image (travelled by way of TIR within the waveguide) approximately twice as often as a single-sided DOE. Beneficially, this could provide for even more image uniformity than could be achieved if the second intermediate-component (e.g., 815) were implemented a single sided DOE.

Further, in accordance with certain embodiments of the present technology, the number of intermediate-components may be greater than two in order to further improve the pupil redistribution, and thus, further improve image uniformity. The operational principles of the additional intermediate-components (for example third and fourth intermediate-components) are the same as that of the second-intermediate component 815 described with reference to FIGS. 8A and 8B. However, the grating periods and grating orientation of the further (e.g., third and fourth intermediate-components) may be different than those of the second intermediate-component 815.

Figure 9:
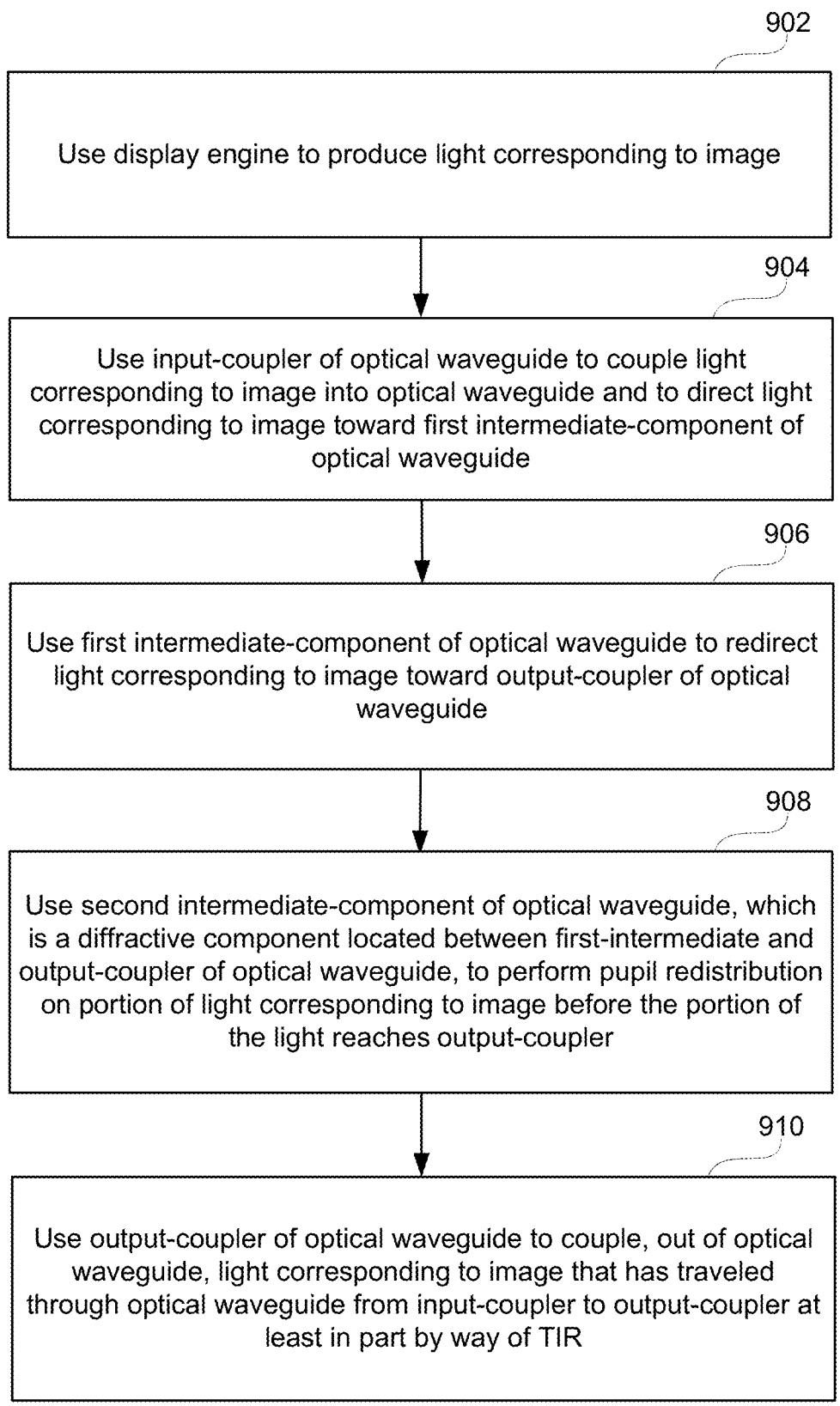
FIG. 9 is a high level flow diagram that is used to describe methods according to certain embodiments of the present technology.

The high level flow diagram of FIG. 9 will now be used to summarize methods according to various embodiments of the present technology. Such methods are for use with a display system that includes a display engine and an optical waveguide. Referring to FIG. 9, step 902 involves using the display engine (e.g., 204) to produce light corresponding to an image. Step 904 involves using an input-coupler (e.g., 112) of the optical waveguide (e.g., 800) to couple the light corresponding to the image into the optical waveguide and to direct the light corresponding to the image toward a first intermediate-component (e.g., 114) of the optical waveguide. Step 906 involves using the first intermediate-component (e.g., 114) of the optical waveguide (e.g., 800) to redirect the light corresponding to the image toward an output-coupler (e.g., 116) of the optical waveguide. Step 908 involves using a second intermediate-component (e.g., 815) of the optical waveguide (e.g., 800), which is a diffractive component located between the first-intermediate component (114) and the output-coupler (116) of the optical waveguide, to perform pupil redistribution on a portion of the light corresponding to the image before the portion of the light reaches the output-coupler. Step 910 involves using the output-coupler (e.g., 116) of the optical waveguide (e.g., 800) to couple, out of the optical waveguide, the light corresponding to the image that has traveled through the optical waveguide from the input-coupler (e.g., 112) to the output-coupler (e.g., 116) at least in part by way of total internal reflection (TIR).

In accordance with certain embodiments, step 906 can include using the first intermediate-component (e.g., 114) to perform one of horizontal or vertical pupil expansion on the light corresponding to the image that is directed toward the first intermediate-component by the input-coupler, and step 910 can include using the output-coupler (e.g., 116) of the optical waveguide to perform the other one of horizontal or vertical pupil expansion. For example, the first intermediate-component 114 can be used to perform horizontal pupil expansion at step 906, and the output-coupler 116 can be used to perform vertical pupil expansion at step 910. Alternatively, the first intermediate-component 114 can be used to perform vertical pupil expansion at step 906, and the output-coupler 116 can be used to perform horizontal pupil expansion at step 910.

In accordance with certain embodiments, step 908 includes using the second intermediate-component 815 to cause the light that is output from the optical waveguide by the output-coupler 116 to have a more uniform intensity distribution compared to if the second intermediate-component 815 were absent and the light corresponding to the image travelled by way of TIR from the first intermediate-component 114 to the output-coupler 116 without interacting with the second intermediate-component 815. More particularly, step 908 can include using second intermediate-component 815 to increase overlap of pupils that are replicated within the waveguide 800 compared to if the second intermediate-component 815 were not used.

In accordance with certain embodiments, step 906 includes using the first intermediate-component 815 to cause both zero-order diffraction and at least one of positive or negative first-order diffraction. In accordance with certain embodiments, step 908 can include using the second intermediate-component 815 to cause both zero-order diffraction and at least one of positive or negative first-order diffraction.

As was described above with reference to FIG. 2, a display engine 204 can include an image former 206, an illuminator 210 and at least one collimating lens 208. In accordance with certain embodiments of the present technology, step 902 involves using an illuminator (e.g., 210), which including one or more light sources, to emit (from each of the light sources) narrowband light having a FWHM bandwidth that is less than 10 nm. In such embodiments, step 902 also includes using an image former (e.g., 206) to produce an image using the narrowband light produced by the illuminator (e.g., 210), and using at least one collimating lens (e.g., 208) to collimate light corresponding to the image produced by the image former and direct the light corresponding to the image toward the input-coupler (e.g., 112) of the optical waveguide (e.g., 800). In accordance with certain such embodiments, step 908 includes using the second-intermediate component (e.g., 815) to fill in gaps between adjacent replicated pupils and thereby increase pupil overlap between adjacent replicated pupils associated with the light corresponding to the image and cause the light that is output from the optical waveguide by the output-coupler to have a more uniform intensity distribution compared to if the second intermediate-component (e.g., 815) were absent.

Were an optical waveguide includes an intermediate-component (e.g., 114) that used for pupil expansion, which is distinct from the input-coupler (e.g., 112) and output-coupler (116) of the waveguide (e.g., 100), the intermediate-component (e.g., 114) typically limits the diagonal FOV of waveguide based displays to no more than 35 degrees. In other words, an intermediate-component, e.g., 114, can typically only support a FOV up to about 35 degrees. By contrast, the input-coupler and the output-coupler of an optical waveguide are each able to support a much larger FOV than an individual intermediate-component. More specifically, the input-coupler and the output-coupler of an optical waveguide can each support a FOV that is at least twice as large as an intermediate component. Accordingly, the intermediate-component is typically the optical component of an optical waveguide that limits the total FOV that can be achieved using the optical waveguide.

In order to increase the FOV that can be supported by an optical waveguide, an optical waveguide, such as the one shown in FIG. 10, may be used. More specifically, referring to FIG. 10, the optical waveguide 1000 is shown as including an input-coupler 1012, two intermediate-components 1014a and 1014b, and an output-coupler 1016. The input-coupler 1012 includes a diffraction grating and is configured to couple light corresponding to an image associated with an input-pupil, and having a corresponding FOV, into the optical waveguide 1000 (and more specifically into the bulk-substrate of the optical waveguide). The input-coupler 1012 is also configured to diffract a portion of the light corresponding to the image in a first direction toward the intermediate-component 1014a such that a first portion of the FOV travels through the optical waveguide 1000 from the input-coupler 1012 to the intermediate-component 1014a, and diffract a portion of the light corresponding to the image in a second direction toward the intermediate-component 1014b such that a second portion of the FOV travels through the optical waveguide 1000 from the input-coupler 1012 to the intermediate-component 1014b. The first and second portions of the FOV differ from one another, and depending upon implementation, may (or may not) partially overlap one another. The first and second directions, in which the input-coupler 212 diffracts light, also differ from one another. In the configuration shown, the first direction is a leftward direction, and the second direction is a rightward direction. More specifically, the first direction is both leftward and acutely angled downward, and the second direction is both rightward and acutely angled downward.

In the configuration shown, the intermediate-component 1014a is configured to perform horizontal pupil expansion, and to diffract light corresponding to the first portion of the FOV, which travels through the optical waveguide from the input-coupler 1012 to the intermediate-component 1014a, toward the output coupler 1016. The intermediate-component 1014b is configured to perform horizontal pupil expansion, and to diffract light corresponding to the second portion of the FOV, which travels through the optical waveguide from the input-coupler 1012 to the intermediate-component 1014b, toward the output coupler 1016. The intermediate-component 1014a can also be referred to more specifically as the left intermediate-component 1014a, and the intermediate-component 1014b can also be referred to more specifically as the right intermediate-component 1014b. The intermediate-components 1014a and 1014b can individually be referred to as an intermediate-component 1014, or collectively as intermediate-components 1014. In alternative embodiments, the layout and optical components can be rearranged and reconfigured (e.g., by rotating the layout by 90 degrees) such that the intermediate-components 1014 are configured to perform vertical pupil expansion, and the output-coupler 1016 is configured to perform horizontal pupil expansion. More generally, the intermediate-components can be configured to perform one of horizontal or vertical pupil expansion, and the output-coupler can be configured to perform the other one of horizontal or vertical pupil expansion.

In the configuration shown, the output-coupler 1016 is configured to combine the light corresponding to the first and second portions of the FOV, which travel through the optical waveguide from the intermediate-components 1014a and 1014b to the output-coupler 1016. The output-coupler 1016 is also configured to couple the light corresponding to the combined first and second portions of the FOV out of the optical waveguide 1000 so that the light corresponding to the image and the combined first and second portions of the FOV is output from the optical waveguide 1000 and viewable from an output-pupil.

In a similar manner as was described above with reference to FIG. 6B, where pupils are relatively small (e.g., due to narrowband light source(s) being used to produce an image), pupils that are replicated by the waveguide 100 may also be spread out such that they do not overlap one another, which detrimentally results in non-smooth pupil filling of the eyebox (proximate the output-coupler 1016) from which a human eye can view the image. For example, the use of one or more LDs as the light source(s) of an illuminator can provide for a substantially uneven pupil distribution, which undesirably provides for a non-uniform intensity distribution in the image. In a similar manner that the second-intermediate component 815 was added between the first intermediate-component 114 and the output-coupler 116 in the discussion of FIG. 8A, one or more further intermediate-components can be added to the waveguide 1000 introduced with reference to FIG. 10. This is shown in and discussed with reference to FIGS. 11 and 12.

Figure 11:
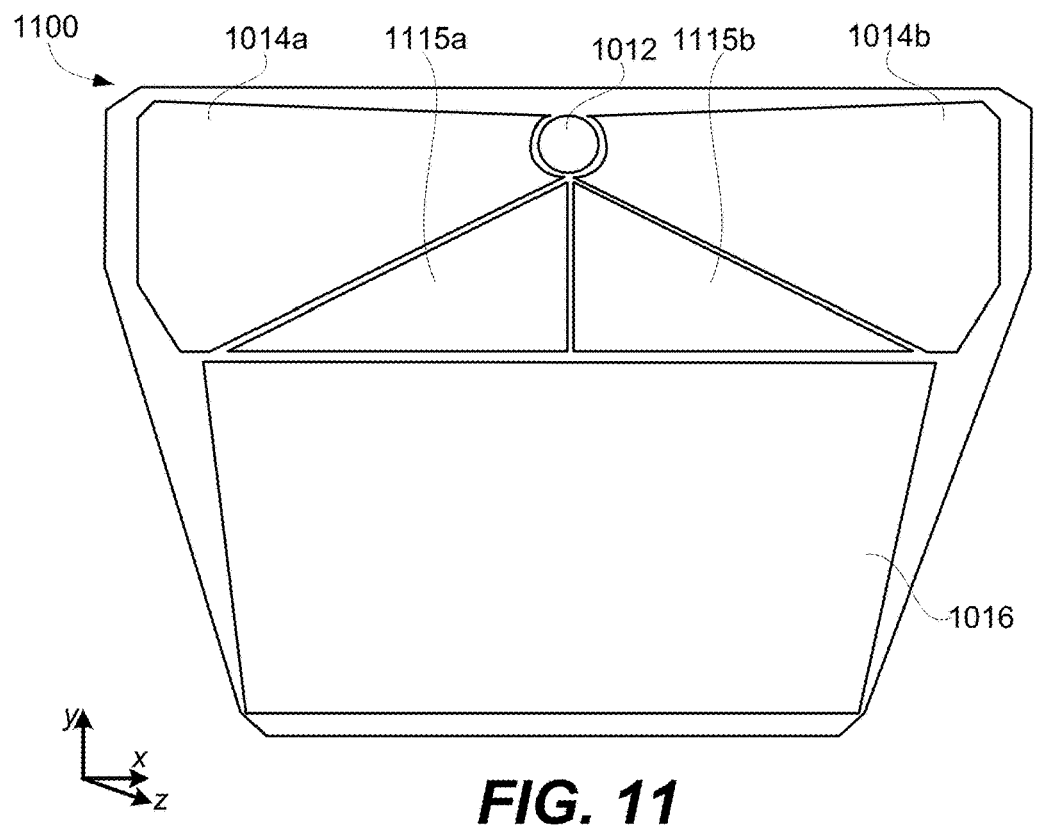
FIGS. 11 and 12 illustrates how the optical waveguide introduced with reference to FIG. 10 can be modified, in accordance with certain embodiments of the present technology.
Figure 12:
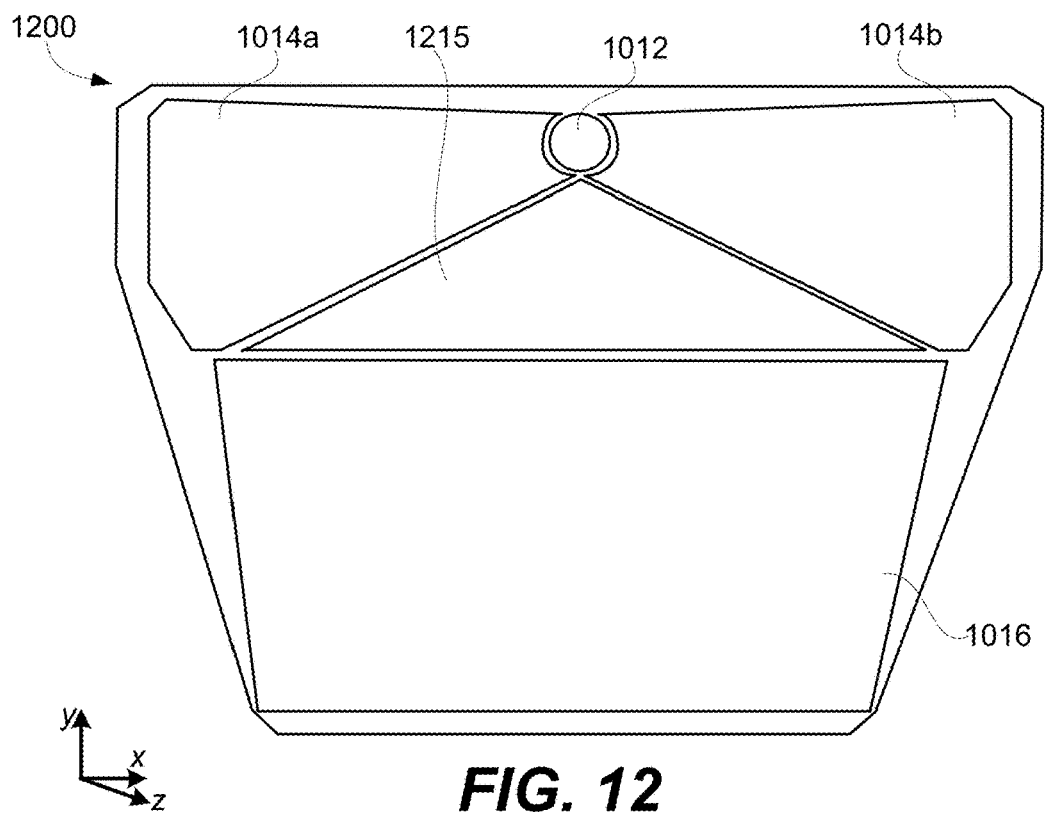

Referring to FIG. 11, the optical waveguide 1100 shown therein is similar to the optical waveguide 1000 described above with reference to FIG. 10, but two additional intermediate-components 1115a and 1115b are added. Referring to FIG. 12, the optical waveguide 1200 shown therein is similar to the optical waveguide 1000 described above with reference to FIG. 10, but one additional intermediate-components 1215 is added. The added intermediate-components 1115a and 1115b in FIG. 11, and the added intermediate-component 1215 in FIG. 12, are configured to function in similar manners as the second intermediate-component 815 described above with reference to FIG. 8A, namely, to perform pupil redistribution on respective portions of the light corresponding to an image before the portions of the light reach the output-coupler 1016. More specifically, these added intermediate-components cause the light that is output from the optical waveguide 1100 or 1200 by the output-coupler 1016 to have a more uniform intensity distribution compared to if the added intermediate-component(s) were absent and the light corresponding to the image travelled by way of TIR from the intermediate-component 1014a and 1014b to the output-coupler 1016 without interacting with the added intermediate-component(s). More generally, FIGS. 10-12 are used to illustrate how one or more intermediate-components can be added to optical waveguides that have different geometries than those discussed above with reference to earlier described FIGS. Further, it should be appreciated that the functionality of the second intermediate-component 815 described above with reference to FIG. 8A can be performed by more than one added intermediate-component. For example, it would be possible to replace the second intermediate-component 815 in FIG. 8A and its functionality with a left second intermediate-component and a right second intermediate-component.

Embodiments of the present technology, which are described above, can be used to provide for a more uniform pupil distribution, and thereby provide for a more uniform image. Preferably, embodiments of the present technology, which are described above, cause the light that is output from a waveguide by an output-coupler to have a more uniform intensity distribution, so that any non-uniformity in intensity is imperceptible to a human eye viewing an image using the waveguide. A substantially uniform angular intensity distribution is especially beneficial in applications where the location of a user's eye(s) is/are fixed relative to the waveguide(s), e.g., in a head-mounted-display (HMD) or other near-eye-display (NED) application. An overall goal of having the light, output by the waveguide, having a substantially uniform intensity distribution is so that any non-uniformity in intensity is imperceptible to a human eye viewing an image using the waveguide.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for use in replicating an image associated with an input-pupil to an output-pupil, the apparatus comprising:

an optical waveguide including an input-coupler, a first intermediate-component, a second intermediate-component and an output-coupler;

the input-coupler of the optical waveguide configured to couple, into the optical waveguide, light corresponding to the image associated with the input-pupil and configured to direct the light corresponding to the image toward the first intermediate-component;

the first intermediate-component configured to perform one of horizontal or vertical pupil expansion on the light corresponding to the image that is directed toward the first intermediate-component by the input-coupler and configured to redirect the light corresponding to the image toward the output-coupler;

the second intermediate-component being a diffractive component located between the first-intermediate component and the output-coupler and configured to perform pupil redistribution on a portion of the light corresponding to the image before the portion of the light reaches the output-coupler;

the output-coupler configured to perform the other one of horizontal or vertical pupil expansion and configured to couple, out of the optical waveguide, the light corresponding to the image that has traveled through the optical waveguide from the input-coupler to the output-coupler at least in part by way of total internal reflection (TIR); and wherein the first intermediate-component is configured to cause both zero-order diffraction and at least one of positive or negative first-order diffraction, and wherein the second intermediate-component is configured to cause both zero-order diffraction and at least one of positive or negative first-order diffraction.

2. The apparatus of claim 1, wherein the second intermediate-component diffracts and thereby interacts with the light corresponding to the image travelled by way of TIR from the first-intermediate-component to the output-coupler.

3. The apparatus of claim 2, wherein:

the optical waveguide includes a first major surface and a second major surface opposite the first major surface; and the second intermediate-component comprises a double-sided DOE including a first grating that is formed in or on the first major surface and a corresponding second grating that is formed in or on the second major surface; and each of the first and second gratings of the double-side DOE diffract and thereby interact with the light corresponding to the image travelled by way of TIR from the first intermediate-component to the output-coupler.

4. The apparatus of claim 2, wherein the second intermediate-component is configured to cause the light that is output from the optical waveguide by the output-coupler to have a more uniform intensity distribution compared to if the second intermediate-component were absent and the light corresponding to the image travelled by way of TIR from the first intermediate-component to the output-coupler without interacting with the second intermediate-component.

5. The apparatus of claim 1, wherein the second intermediate-component is configured to increase overlap of pupils that are replicated within the waveguide compared to if the second intermediate-component were absent.

6. The apparatus of claim 1, wherein with respect to a front view of the waveguide:
the first intermediate-component is located to a side of the input-coupler;
the second intermediate-component is located below the first intermediate-component; and
the output-coupler is located below the second intermediate-component.

7. A method use with a display system that includes a display engine and an optical waveguide, the method comprising:
using the display engine to produce light corresponding to an image;
using an input-coupler of the optical waveguide to couple the light corresponding to the image into the optical waveguide and to direct the light corresponding to the image toward a first intermediate-component of the optical waveguide;
using the first intermediate-component of the optical waveguide to redirect the light corresponding to the image toward an output-coupler of the optical waveguide;
using a second intermediate-component of the optical waveguide, which is a diffractive component located between the first-intermediate component and the output-coupler of the optical waveguide, to perform pupil redistribution on a portion of the light corresponding to the image before the portion of the light reaches the output-coupler;
using the output-coupler of the optical waveguide to couple, out of the optical waveguide, the light corresponding to the image that has traveled through the optical waveguide from the input-coupler to the output-coupler at least in part by way of total internal reflection (TIR); and
wherein the first intermediate-component is configured to cause both zero-order diffraction and at least one of positive or negative first-order diffraction, and wherein the second intermediate-component is configured to cause both zero-order diffraction and at least one of positive or negative first-order diffraction.

8. The method of claim 7, wherein:
the using the first intermediate-component includes using the first intermediate-component to perform one of horizontal or vertical pupil expansion on the light corresponding to the image that is directed toward the first intermediate-component by the input-coupler; and
the using the output-coupler includes using the output-coupler of the optical waveguide to perform the other one of horizontal or vertical pupil expansion.

9. The method of claim 7, wherein the using the second intermediate-component causes the light that is output from the optical waveguide by the output-coupler to have a more uniform intensity distribution compared to if the second intermediate-component were not used and the light corresponding to the image travelled by way of TIR from the first intermediate-component to the output-coupler without interacting with the second intermediate-component.

10. The method of claim 7, wherein the using second intermediate-component increases overlap of pupils that are replicated within the waveguide compared to if the second intermediate-component were not used.

11. The method of claim 7, wherein the using the display engine to produce light corresponding to an image includes:
using an illuminator including one or more light sources to emit, from each of the light sources, narrowband light having a full width at half maximum (FWHM) bandwidth that is less than 10 nm;
using an image former to produce an image using the narrowband light produced by the illuminator; and
using at least one collimating lens to collimate light corresponding to the image produced by the image former and direct the light corresponding to the image toward the input-coupler of the optical waveguide.

12. The method of claim 11, wherein the using the second-intermediate component includes using the second-intermediate component to fill in gaps between adjacent replicated pupils and to thereby increase pupil overlap between adjacent replicated pupils associated with the light corresponding to the image and cause the light that is output from the optical waveguide by the output-coupler to have a more uniform intensity distribution compared to if the second intermediate-component were not used.

13. A near-eye or heads-up display system, comprising:
a display engine configured to output light corresponding to an image;
an optical waveguide including an input-coupler, a first intermediate-component, a second intermediate-component and an output-coupler;
the input-coupler of the optical waveguide configured to couple, into the optical waveguide, light corresponding to an image produced by the display engine and configured to direct the light corresponding to the image toward the first intermediate-component of the optical waveguide;
the first intermediate-component of the optical waveguide configured to redirect the light corresponding to the image toward the output-coupler;
the second intermediate-component being a diffractive component located between the first-intermediate component and the output-coupler and configured to perform pupil redistribution on a portion of the light corresponding to the image before the portion of the light reaches the output-coupler;
the output-coupler configured to couple, out of the optical waveguide, light corresponding to the image that has traveled through the optical waveguide from the input-coupler to the output-coupler at least in part by way of total internal reflection (TIR); and
wherein the first intermediate-component is configured to cause both zero-order diffraction and at least one of positive or negative first-order diffraction, and wherein the second intermediate-component is configured to cause both zero-order diffraction and at least one of positive or negative first-order diffraction.

14. The system of claim 13, wherein:
the first intermediate-component of the optical waveguide is configured to perform one of horizontal or vertical pupil expansion on the light corresponding to the image that is directed toward the first intermediate-component by the input-coupler; and the output-coupler of the optical waveguide is configured to perform the other one of horizontal or vertical pupil expansion.

15. The system of claim 13, wherein the display engine includes:
- an illuminator including one or more light sources each of which is configured to emit narrowband light having a full width at half maximum (FWHM) bandwidth that is less than 10 nm;
- an image former configured to produce an image using the narrowband light produced by the illuminator; and
- at least one collimating lens arranged and configured to receive and collimate light corresponding to the image produced by the image former and direct the light corresponding to the image toward the input-coupler of the optical waveguide.

16. The system of claim 15, wherein if the second intermediate-component of the optical waveguide were not included within the optical waveguide, the narrowband light produced by the one or more light sources of the illuminator of the display engine would result in gaps between adjacent replicated pupils which would cause a non-uniform intensity distribution when the image is viewed from an eyebox proximate the output-coupler of the optical waveguide.

17. The system of claim 12, wherein:
the second intermediate-component diffracts and thereby interacts with the light corresponding to the image travelled by way of TIR from the first intermediate-component to the output-coupler.

* * * * *